United States Patent [19]
Wagstaff

[11] Patent Number: 5,704,562
[45] Date of Patent: Jan. 6, 1998

[54] CUTTERHEAD FOR FORAGE HARVESTER

[75] Inventor: Robert A. Wagstaff, Lancaster, Pa.

[73] Assignee: New Holland North America, Inc., New Holland, Pa.

[21] Appl. No.: 782,691

[22] Filed: Jan. 16, 1997

[51] Int. Cl.$^6$ ................................. B02C 18/18
[52] U.S. Cl. ........................... 241/294; 241/221
[58] Field of Search ........................ 241/221, 294, 241/222, 242

[56] References Cited

U.S. PATENT DOCUMENTS

| | | |
|---|---|---|
| 3,357,467 | 12/1967 | Morkoski . |
| 3,378,053 | 4/1968 | Potzsch . |
| 3,873,038 | 3/1975 | Wagstaff . |
| 3,958,766 | 5/1976 | Shriver . |
| 4,061,284 | 12/1977 | Raisbeck et al. . |
| 4,189,875 | 2/1980 | Flenniken . |
| 4,209,137 | 6/1980 | McAllister et al. . |
| 4,257,566 | 3/1981 | Lawrence . |

FOREIGN PATENT DOCUMENTS

| | | |
|---|---|---|
| 93543 | 5/1962 | Denmark . |
| 377124 | 8/1973 | U.S.S.R. . |

Primary Examiner—Mark Rosenbaum
Attorney, Agent, or Firm—Frank A. Seemar; Larry W. Miller; John W. Stader

[57] ABSTRACT

A rotatable forage harvester cutterhead having a rotatable shaft, and a plurality of axially spaced disc shaped plate members having substantially the same diameters and affixed in parallel planes transversely along the shaft for rotation therewith. A plurality of mounting members are detachably secured to the plate members for mounting a drum having an inner surface having a diameter at least as great as the diameters of the disc shaped plate members. Attachment means are employed for detachably securing the drum to the mounting members. Each of a plurality of substantially flat knives with a cutting edge extending in a transverse direction less than half the axial length of the drum are mounted on knife support assemblies comprising support blocks. The attachment means for securing the drum to the discs also secures the knife support blocks to the outer surface of the drum. Fasteners secure the knives to the blocks with the cutting edges extending in the direction of rotation of the cutterhead and generating a cylinder, under conditions where the cutterhead rotates, having a diameter larger than the diameter of the drum.

14 Claims, 4 Drawing Sheets

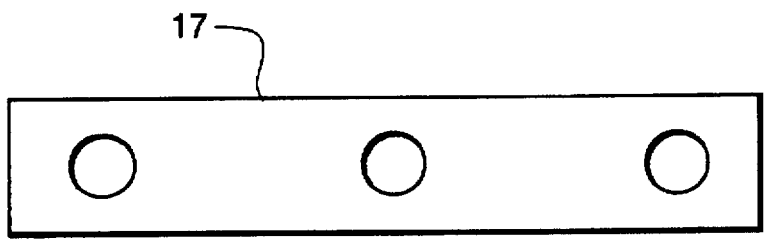
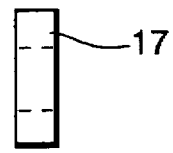
Fig. 6         Fig. 7
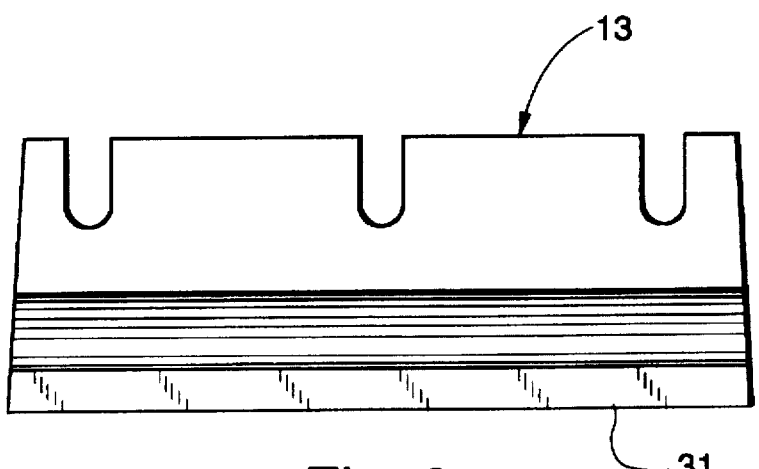
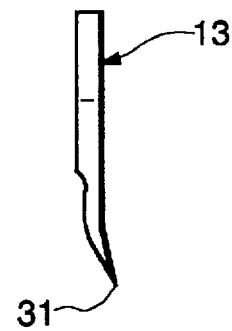
Fig. 8         Fig. 9
PRIOR ART    PRIOR ART
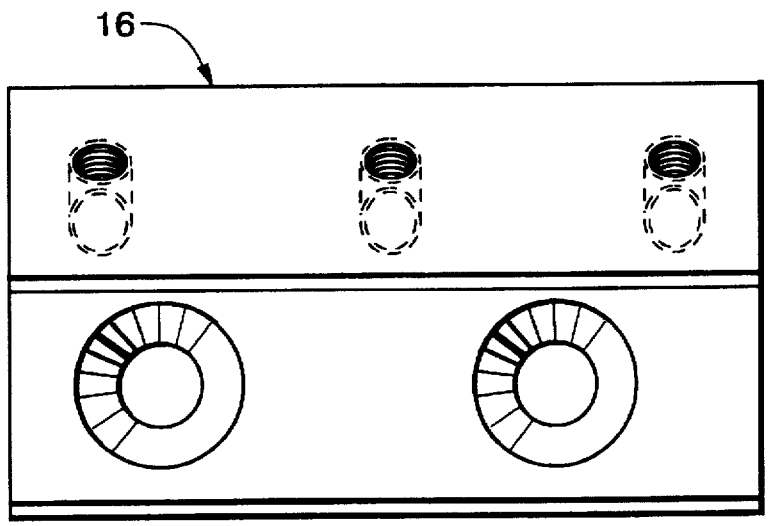
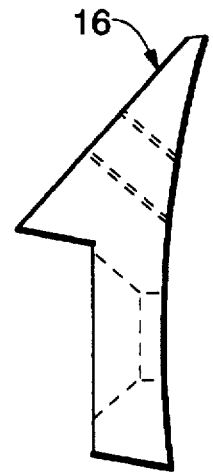
Fig. 10        Fig. 11

5,704,562

1

CUTTERHEAD FOR FORAGE HARVESTER

CROSS REFERENCE TO RELATED APPLICATION

This application claims the benefit of U.S. Provisional Application No. 60/011,682, filed Feb. 15, 1996.

FIELD OF THE INVENTION

The present invention relates generally to forage harvesters and more particularly to cutterhead apparatus adaptable for converting a forage harvester cutterhead unit from a spiral knife configuration to a segmented knife configuration.

BACKGROUND OF THE INVENTION

A typical forage harvester operates in a field to process windrowed or standing forage crop and includes a mobile base unit that is either self propelled or pulled by a tractor. A header, attached to the base unit, either cuts standing crop material such as corn or picks up windrowed crop material such as hay and feeds such crop material rearwardly. The base unit includes a forwardly located generally rectangular inlet opening adjacent the header for receiving crop material from the attachment. A feeding assembly spans the width of the inlet opening for conveying material fed into the base unit to a cutting assembly that chops it into pieces appropriately sized for feeding to livestock. Also included on the base unit are means for transferring the chopped crop material to a vehicle that transports it from the field to a remote location where it is delivered to a storage facility, such as a silo.

Prior art cutting assemblies typically consist of a rotating cutterhead on which knives are mounted for travel through a cylindrical path, and a fixed knife mounted adjacent the path of the moving knives. The feeding assembly usually comprises one or more pairs of opposing counter-rotating rolls for feeding a mat of crop material across the fixed knife, commonly referred to as a shear bar, operatively associated with cutting edges on the moving knives. The crop material is chopped into lengths determined by the relationship of the feed rate of the feed rolls to the rotational speed of the cutterhead.

One known type of cutterhead consists of a plurality of spiral knives mounted on a series of side by side axially spaced disc shaped members. Exemplary structure of this nature is shown in U.S. Pat. No. 4,209,137, issued Jun. 24, 1980 in the name of Ronald L. McAllister, et al. FIGS. 1 and 2 of this patent are identified as prior art and presented in this application as FIGS. 3 and 4. Other examples of prior art forage harvesters having spiral knives mounted via a plurality of spaced disc shaped plates are disclosed in U.S. Pat. No. 3,958,766, issued May 25, 1976 in the name of Joe E. Shriver, and U.S. Pat. No. 3,873,038, issued Mar. 25, 1975 in the name of Robert A. Wagstaff.

Another well known cutterhead design employs a segmented knife configuration mounted on a hollow cylindrical drum, an example of which is disclosed in U.S. Pat. No. 4,061,284, issued Dec. 6, 1977 in the name of Wesley Paul Raisbeck, et al. Another example of prior art showing a similar configuration is U.S. Pat. No. 4,189,875, issued Feb. 26, 1980 in the name of John H. Flenniken, in which a perspective view of a segmented knife arrangement mounted on a hollow cylindrical drum is shown at FIG. 2.

It should be noted that insofar as segmented knives are concerned, the simple flat knife design contemplated in the cutterhead shown in U.S. Pat. No. 4,061,284, mentioned above, is not uncommon. However, various other knife designs are known. For example, U.S. Pat. No. 4,257,566, issued Mar. 24, 1981 in the name of Allan K. Lawrence, Danish Patent No. 93,543, issued May 28, 1962, and Russian Patent No. 377,124 issued in 1973, all disclose various bent knife configurations. Another knife design, a curved shape, is shown in U.S. Pat. No. 3,357,467, issued Dec. 12, 1967 in the name of James Morkoski, and U.S. Pat. No. 3,378,053, issued Apr. 16, 1968 in the name of Wolfgang R. Potsch.

Over the years, operators of forage harvesters have been inclined to favor either segmented knives or spiral knives based on little more than the perception that one or the other is better, based purely on brand preference. Be that as it may, selection of the entire unit in many instances is based solely on cutterhead design, rather than performance. In other instances, the choice of segmented knives is based on the fact that a single knife is more readily set up than a plurality of short knife segments. On the other hand, some prefer segmented knives because damage is limited to short segments rather than a long knife when a large piece of tramp metal finds its way to the cutterhead.

Regardless of the reason, in deference to such perception, farm equipment dealers can best serve their customers by making forage harvesters available with either spiral or segmented knives. In the past when a forage harvester has been converted from segmented knife design to spiral knife design, or visa vera, it has been necessary to interchange one entire assembly for the other. This has proven to be a very costly undertaking, which has left the operator with the dilemma of weighing the cost against his desire for a preferred knife design on a base unit of choice. Having encountered this problem, manufacturers would best serve their customers if a forage harvester could be offered with one cutterhead design that is convertible by dealers to the other design. To satisfy customer needs at the marketplace with an approach of this nature it is also necessary to be aware of the ever present need to provide to the farmer reliable, durable equipment at a reasonable cost.

SUMMARY OF THE INVENTION

An important object of the present invention is to overcome the problems mentioned above by providing simple and reliable apparatus for converting a spiral knife forage harvester cutterhead to a segmented knife cutterhead.

In pursuance of this and other important objects the present invention contemplates a rotatable forage harvester cutterhead comprising a rotatable shaft, a plurality of axially spaced disc shaped plate members having substantially the same diameters and affixed in parallel planes transversely along the shaft for rotation therewith, a plurality of mounting members detachably secured to the plate members, a drum having an inner surface having a diameter at least as great as the diameters of the disc shaped plate members, attachment means for detachably securing the drum to the mounting members, and a plurality of substantially flat knives. Each knife has a cutting edge extending in a transverse direction less than half the axial length of the drum. The cutterhead further comprises a plurality of knife support assemblies comprising support blocks, the attachment means detachably securing the support blocks to the outer surface of the drum, and fastener means for securing the knives to the blocks with the cutting edges extending in the direction of rotation of the cutterhead and generating a cylinder as the cutterhead rotates, which cylinder has a diameter larger than the diameter of the drum.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

BRIEF DESCRIPTION OF THE DRAWINGS

FIG. 6 is a plan view of a clamping plate, one each of which is used with each knife.

FIG. 7 is an end elevational view of the clamping plate shown in FIG. 6.

FIG. 8 is a plan view of a prior art knife design.

FIG. 9 is an end elevational view of the prior art knife shown in FIG. 8.

FIG. 10 is a plan view of a knife support block, on each of which is used in conjunction with a clamping plate to hold each knife in place.

FIG. 11 is an end elevational view of the knife support block shown in FIG. 10.

DESCRIPTION OF THE PREFERRED EMBODIMENT

Figure 1:
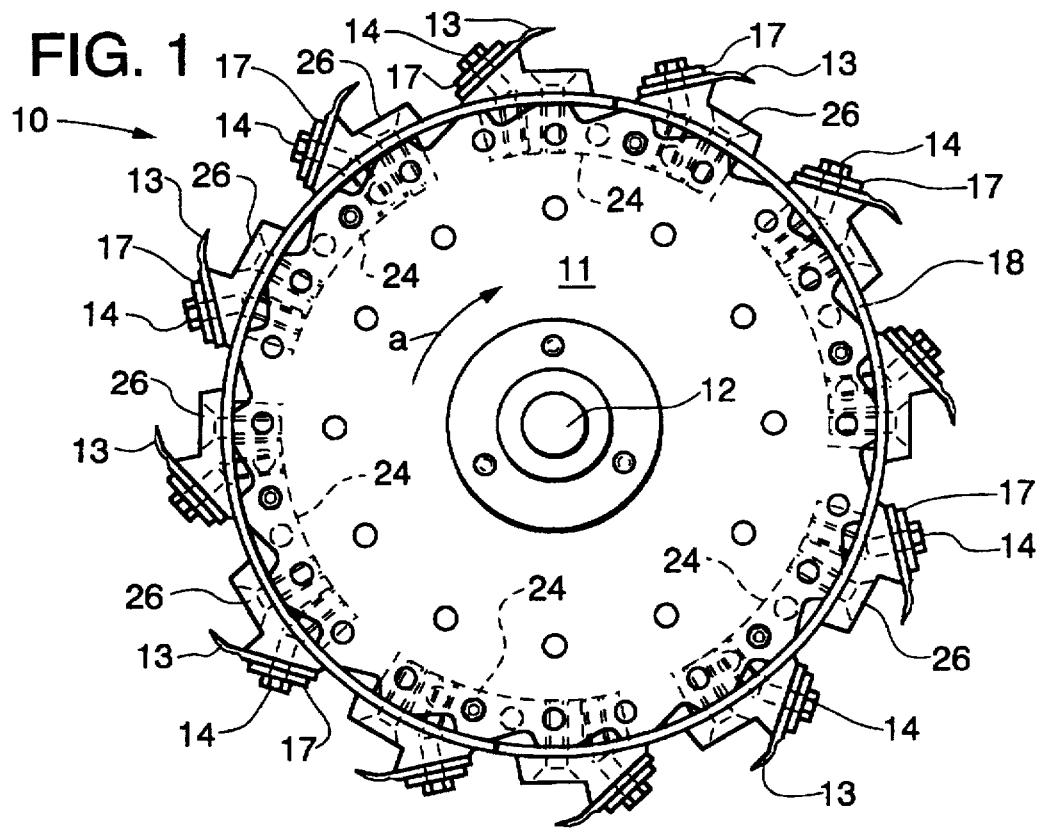
FIG. 1 is an end elevational view of a forage harvester cutterhead in which the present invention is embodied.
Figure 2:
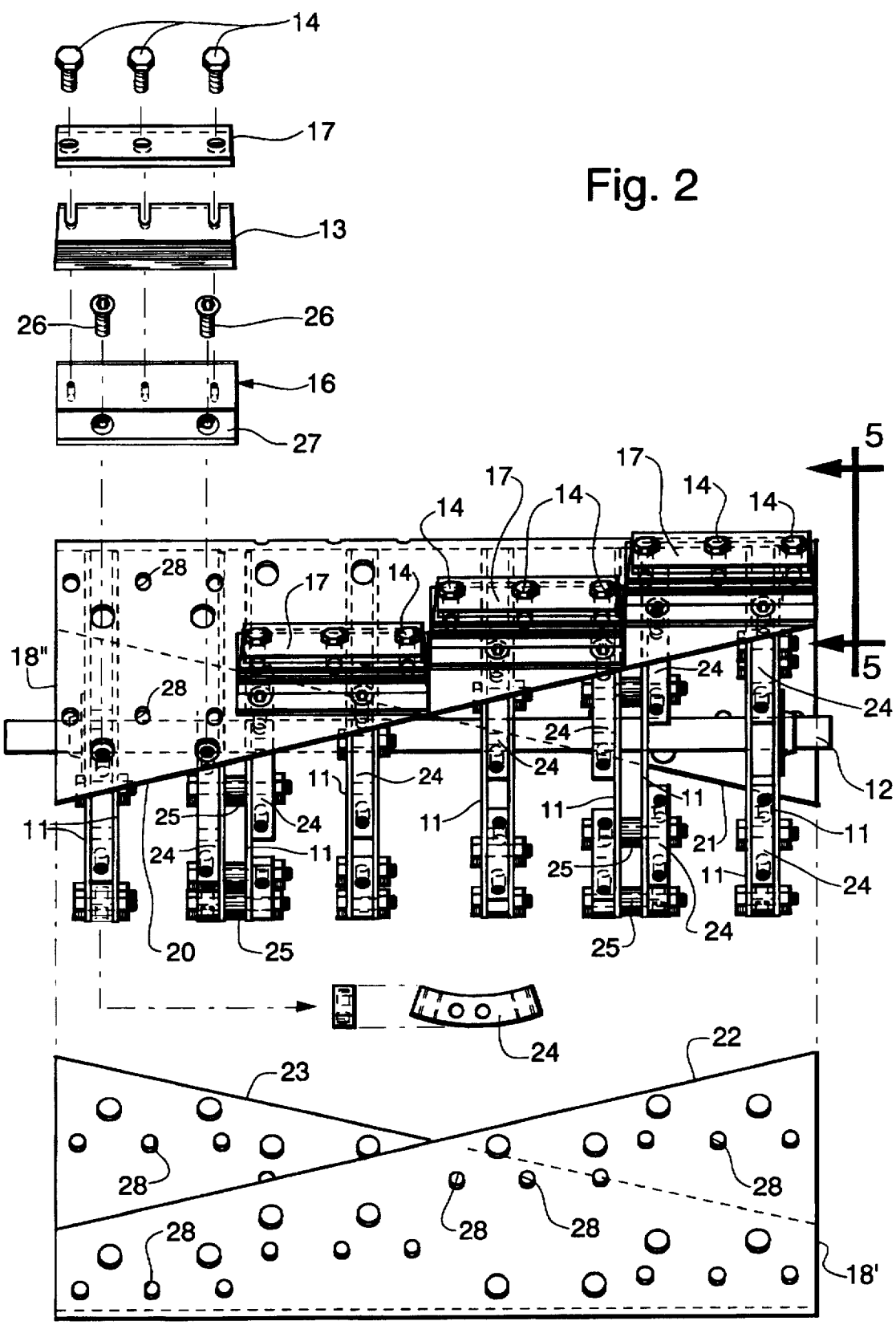
FIG. 2 is a diagrammatical top view of the forage harvester cutterhead shown in FIG. 1, and shows several parts in an exploded fashion.
Figure 3:
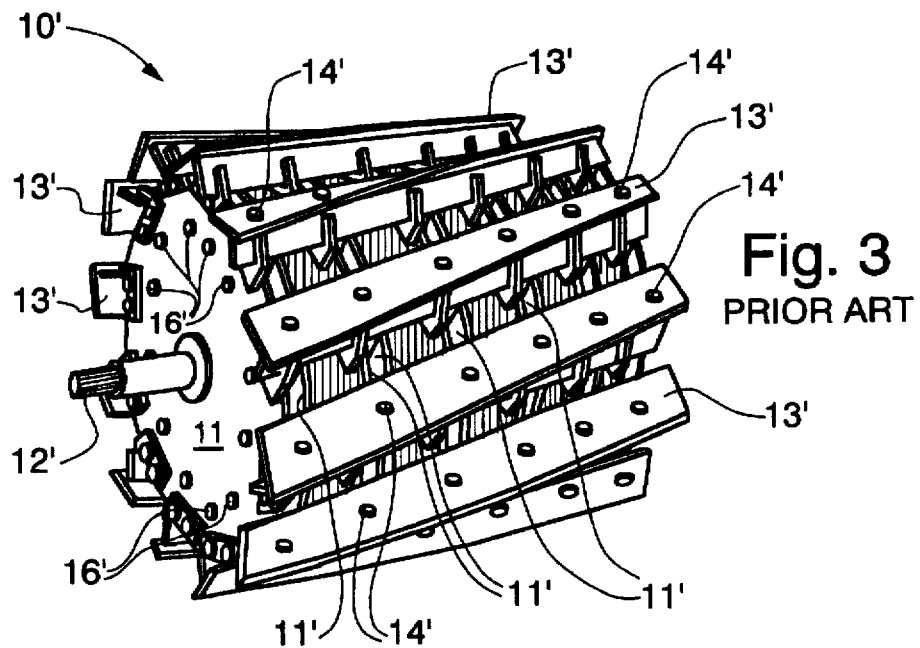
FIG. 3 is a perspective view of a prior art forage harvester cutterhead.
Figure 4:
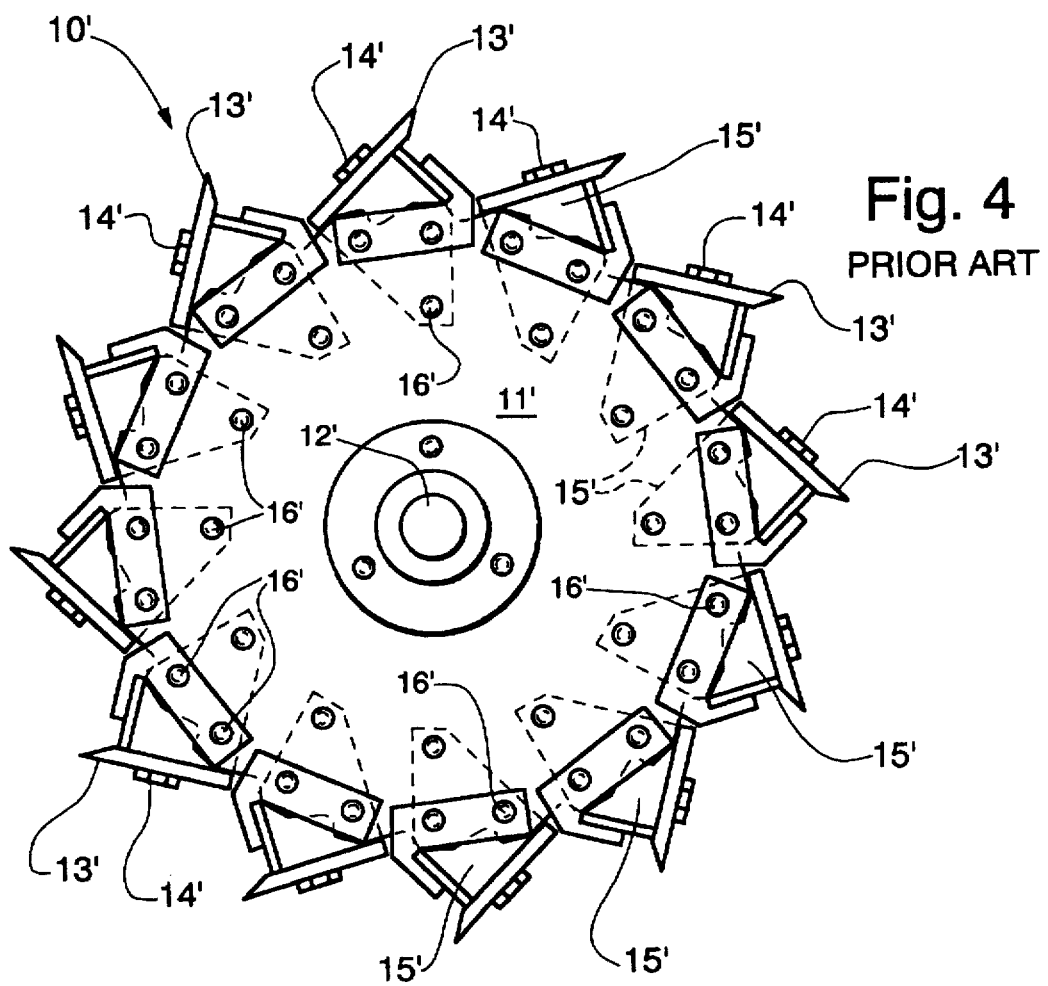
FIG. 4 is an end elevational view of the prior art forage harvester cutterhead shown in FIG. 3.

Referring now to the drawings for a more detailed description of the present invention, FIG. 1 shows the end view of a forage harvester cutterhead, generally designated by reference numeral 10, in which the present invention is embodied. In FIG. 2 a front view of cutterhead 10 is shown in which key parts are depicted in exploded fashion to illustrate the unique manner in which a prior art spiral knife cutterhead is converted to a segmented knife cutterhead. To this end, FIGS. 3 and 4 show a typical prior art spiral knife cutterhead 10' of the type shown in above mentioned U.S. Pat. No. 4,209,137, hereby incorporated by reference.

Cutterhead 10' comprises a plurality of disc shaped plate members 11' positioned in axially spaced relationship to each other along a central shaft 12'. Plate members 11' are mounted on shaft 12' by any suitable means such as, for example, splines and keys. Pairs of plate members 11' are equally spaced along the shaft. A plurality of spirally shaped knives 13' are secured outwardly of plate members 11' by clamping bolts 14' screwed into tapped holes in mounting blocks 15' which are affixed to members 11' via bolts 16'.

Turning now to FIG. 2, six pairs of disc shaped plate members 11 are positioned in axially spaced relationship to each other along a central shaft 12. Plate members 11 are equally spaced along shaft 12 in the same manner as the plates and shaft of the prior art cutterhead depicted in FIGS. 3 and 4. A plurality of segmented knives 13 are secured outwardly of plate members 11 by clamping bolts 14 screwed into tapped holes in knife support blocks 16, one of which is shown in FIGS. 10 and 11. A knife clamping plate 17, shown separately in FIGS. 6 and 7, completes the knife support assembly.

A drum 18, interposed between the knife support assemblies and disc shaped plate members 11, comprises a first drum section 18' and a second drum section 18", which when assembled form a cylindrical drum having an inner diameter substantially the same as the diameters of disc shaped plate members 11. When drum sections 18'and 18" are assembled transverse edge surfaces 20, 21 and 22, 23, respectively, are adjacently diametrically disposed.

Figure 5:
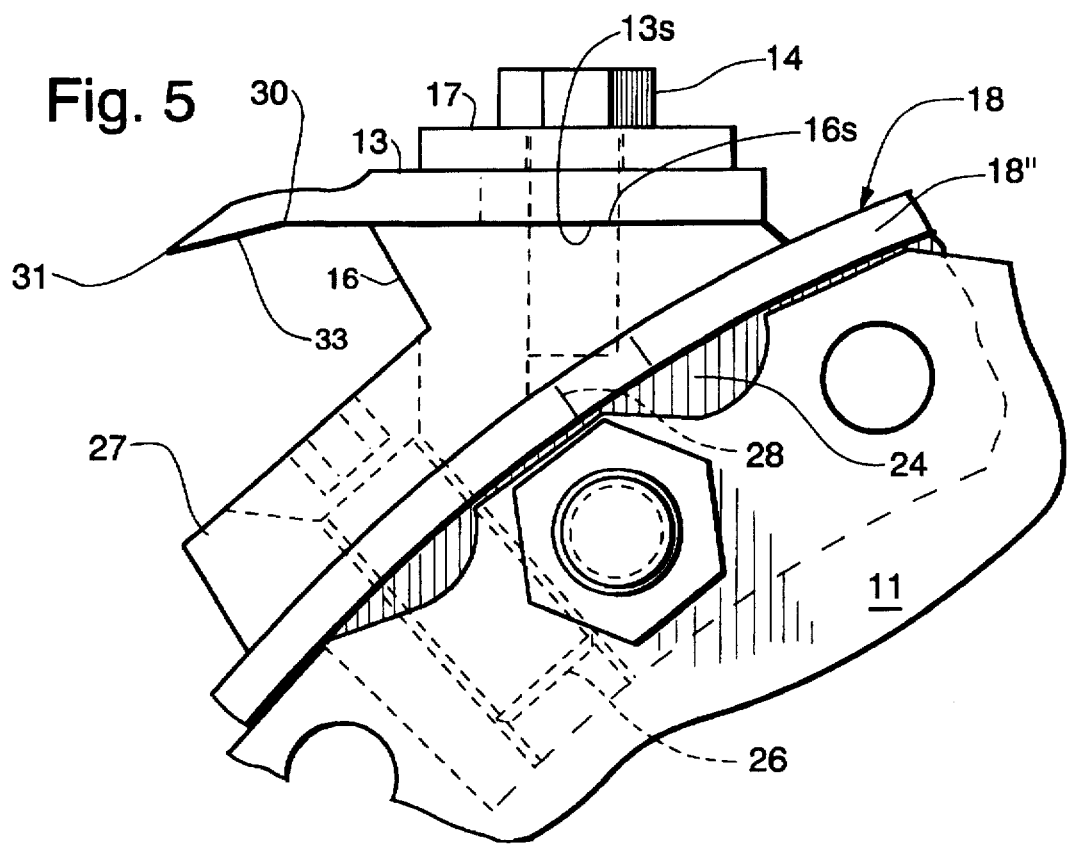
FIG. 5 is a view taken in the direction of arrows 5—5 in FIG. 2 showing a fragmentary enlargement of a portion of the cutterhead.

A plurality of arcuately shaped mounting blocks 24 are bolted to the outer edges of plate members 11 with the outer curved surfaces of the blocks extending past the outer edges of plate members 11, as shown in FIG. 5. These mounting blocks are mounted between the paired plates in four instances, while in the other two sets, the second innermost from each side, the blocks are mounted outwardly of the plates with spacers 25 between the plates aligned with the blocks. As also shown in FIG. 5, the entire cutterhead arrangement is secured together by screws 26 which pass through flange portion 27 of knife support blocks 16 and drum 18, and are snugly secured in tapped holes in mounting blocks 24. Each knife support block 16 is attached to two laterally adjacent mounting blocks, and each mounting block receives screws from two circumferentially adjacent knives. In the adjacent edge area of the drum sections, a mounting block 24 spans from one section to the other and receives screws from two circumferentially adjacent knife support blocks 16. No knife support blocks are mounted across the juncture between the edges, which due to tolerances may be slightly uneven. This enables the knifes to be precisely mounted thereby enhancing the sharpening function of their cutting edges which travel in a common cylindrical path. It should also be noted with respect to drum 18 that a series of small holes 28 provide relief for knife clamping bolts 14 (see FIG. 5).

Although knife 13, adjustably mounted via slots 28 in a well known manner, is shown as having a bent configuration, other designs, such as the straight knife shown in U.S. Pat. No. 4,061,284, mentioned above, can also be employed. More particularly, knife 13 is bent at bend 30 along a line generally parallel to cutting edge 31 (see FIGS. 5, 8 and 9). A bent knife design of this type is well known in the prior art, as illustrated by U.S. Pat. No. 4,257,566, also mentioned above, hereby incorporated by reference. By further reference to the prior art disclosure of U.S. Pat. No. 4,061,284, mentioned above, it is clear that it is well known to the skilled artisan that segmented knife configurations include rows of knives arranged in a side by side fashion over the full surface of a drum with adjacent knives offset along spiral paths. The present invention accommodates segmented knives in this configuration, as shown in the drawings, but is adaptable to accommodate any other configuration that results in a cylindrical knife path.

In operation, the cutterhead comprises an integral part of a forage harvester and is rotated by the power source of the harvester in direction "a" (see FIG. 1) whereupon the cutting edges of the knives generate a cylinder corresponding to the path of the knives. This path brings the knives in contact with crop material being fed across an associated fixed shear bar (not shown) in a well known manner.

Of the many implicit and explicit advantages of the present invention one of the most important is the provision of a unique design for a forage harvester cutterhead that is readily adaptable for converting a cutterhead having a spiral knife configuration to a segmented knife configuration, and visa versa. It is especially useful in avoiding the need to determine which specific cutterhead design must be opted for at the time of the manufacture of the forage harvester base unit. Customer desires can be subsequently met in an effective and cost effective manner without change to the central supporting structure. Thus, the knives 13' and knife supports can be removed from a forage harvester cutterhead 10', leaving a plurality of disc shaped plate members on shaft 12, whereupon drum 18, knives 13 and knife support blocks can be secured thereto via mounting blocks 24.

While preferred structure in which the principles of the present invention are shown and described above, it is to be understood that the invention is not limited to such structure, but that, in fact, widely different means of varying scope and configuration may be employed in the practice of the invention.

Having thus described the invention, what is claimed is:

1. A rotatable forage harvester cutterhead comprising
   a rotatable shaft,
   a plurality of axially spaced disc shaped plate members having substantially the same diameters and affixed in parallel planes transversely along said shaft for rotation therewith,
   a plurality of mounting members detachably secured to said plate members,
   a drum having an inner surface having a diameter at least as great as the diameters of said disc shaped plate members,
   attachment means for detachably securing said drum to said mounting members,
   a plurality of substantially flat knives, each knife having a cutting edge extending in a transverse direction less than half the axial length of said drum,
   a plurality of knife support assemblies comprising support blocks, said attachment means detachably securing said support blocks to the outer surface of said drum, and
   said knife support assembly further comprising fastener means for securing said knives to said blocks with the cutting edges extending in the direction of rotation of said cutterhead and generating a cylinder as the cutterhead rotates, said cylinder having a diameter larger than the diameter of said drum.

2. A forage harvester cutterhead as set forth in claim 1 wherein
   each of said mounting members has an outwardly facing surface extending at least as far as the circumference of the plate to which it is secured, and
   said attachment means holds said inner surface of said drum against said outwardly facing surfaces.

3. A forage harvester cutterhead as set forth in claim 2 wherein
   said outwardly facing surfaces of said mounting members have an arcuate shape such that the entire outwardly facing surface engages said drum inner surface.

4. A forage harvester cutterhead as set forth in claim 2 wherein
   said drum is formed from at least two separate parts having like arcuate cross sections, and transverse edge surfaces that are held in contiguous relationship under conditions where said attachment means secure said drum to said mounting members.

5. A forage harvester cutterhead as set forth in claim 4 wherein
   said plurality of axially spaced discs are affixed along said shaft in pairs.

6. A forage harvester cutterhead as set forth in claim 4 wherein
   said plurality of support blocks are attached in groups of two or more in side-by-side fashion, the blocks in each group being aligned with said contiguous edge surfaces.

7. A forage harvester cutterhead as set forth in claim 4 wherein
   said outwardly facing surfaces of certain ones of said mounting members extend across said transverse edge surfaces of said drum parts at the area of contiguous relationship, and
   said attachment means for detachably securing said drum secures said at least two separate parts of said drum to the same certain ones of said mounting members.

8. In a rotatable forage harvester cutterhead comprising
   a rotatable shaft,
   a plurality of axially spaced disc shaped plate members having substantially the same diameters and affixed in parallel planes transversely along said shaft for rotation therewith,
   a plurality of substantially flat knives, each knife having a cutting edge extending in a transverse direction less than half the axial length of the distance between the outermost discs, the improvement comprising
   a plurality of mounting members detachably secured to said plate members,
   a drum having an inner surface having a diameter at least as great as the diameters of said disc shaped plate members,
   attachment means for detachably securing said drum to said mounting members,
   a plurality of knife support assemblies comprising support blocks, said attachment means detachably securing said support blocks to the outer surface of said drum, and
   said knife support assembly further comprising fastener means for securing said knives to said blocks with the cutting edges extending in the direction of rotation of said cutterhead and generating a cylinder as the cutterhead rotates, said cylinder having a diameter larger than the diameter of said drum.

9. A forage harvester cutterhead as set forth in claim 8 wherein
   each of said mounting members has an outwardly facing surface extending at least as far as the circumference of the plate to which it is secured, and
   said attachment means holds said inner surface of said drum against said outwardly facing surfaces.

10. A forage harvester cutterhead as set forth in claim 9 wherein
    said outwardly facing surfaces of said mounting members have an arcuate shape such that the entire outwardly facing surface engages said drum inner surface.

11. A forage harvester cutterhead as set forth in claim 9 wherein
    said drum is formed from at least two separate parts having like arcuate cross sections, and transverse edge surfaces that are held in contiguous relationship under conditions where said attachment means secure said drum to said mounting members.

12. A forage harvester cutterhead as set forth in claim 11 wherein said plurality of axially spaced discs are affixed along said shaft in pairs.

13. A forage harvester cutterhead as set forth in claim 11 wherein said plurality of support blocks are attached in groups of two or more in side-by-side fashion, the blocks in each group being aligned with said contiguous edge surfaces.

14. A forage harvester cutterhead as set forth in claim 11 wherein said outwardly facing surfaces of certain ones of said mounting members extend across said transverse edge surfaces of said drum parts at the area of contiguous relationship, and said attachment means for detachably securing said drum secures said at least two separate parts of said drum to the same certain ones of said mounting members.

\* \* \* \* \*